United States Patent
Zhang (10) Patent No.: US 9,647,908 B2
(45) Date of Patent: May 9, 2017

(54) METHOD, APPARATUS AND SYSTEM FOR DETERMINING SOFTWARE PERFORMANCE

(71) Applicant: TENCENT TECHNOLOGY (SHENZHEN) COMPANY LIMITED, Shenzhen (CN)

(72) Inventor: Huajian Zhang, Shenzhen (CN)

(73) Assignee: Tencent Technology (Shenzhen) Company Limited, Shenzhen, Guangdong (CN)

(*) Notice: Subject to any disclaimer, the term of this patent is extended or adjusted under 35 U.S.C. 154(b) by 183 days.

(21) Appl. No.: 14/698,357

(22) Filed: Apr. 28, 2015

(65) Prior Publication Data

US 2015/0244592 A1   Aug. 27, 2015

Related U.S. Application Data

(63) Continuation of application No. PCT/CN2013/086098, filed on Oct. 29, 2013.

(30) Foreign Application Priority Data

Oct. 29, 2012 (CN) .......................... 2012 1 0420867

(51) Int. Cl.
*G06F 15/173* (2006.01)
*H04L 12/26* (2006.01)
*G06F 11/34* (2006.01)

(52) U.S. Cl.
CPC .......... *H04L 43/04* (2013.01); *G06F 11/3419* (2013.01); *G06F 11/3466* (2013.01); *H04L 43/08* (2013.01); *G06F 2201/865* (2013.01)

(58) Field of Classification Search
USPC ....... 709/203, 217, 219, 223, 224, 227, 228, 709/232, 238; 370/252; 1/1
See application file for complete search history.

(56) References Cited

U.S. PATENT DOCUMENTS 7,092,987 B2 * 8/2006 Brittingham ........ G06F 9/44505 709/227
8,503,336 B2 * 8/2013 Rappaport ............ H04L 41/145 370/252

(Continued)

FOREIGN PATENT DOCUMENTS

CN          101211311 A      7/2008
CN          101635655 A      1/2010

(Continued)

OTHER PUBLICATIONS

Chinese Office Action for Application No. 2012104208673, dated Aug. 16, 2016, and an English concise explanation of relevance thereof.

(Continued)

*Primary Examiner* — Quang N Nguyen
(74) *Attorney, Agent, or Firm* — Harness, Dickey & Pierce, P.L.C.

(57) ABSTRACT

A method, apparatus and system for determining software performance. After the software is published, performance parameters of operation systems of running the software and performance parameters of run software are acquired from various user terminals. The performance parameters of the operation system of running the software and the performance parameters of the run software is processed to acquire a performance parameter processing result according to a preset method for processing a performance parameter. Performance of the software is determined according to the performance parameter processing result.

11 Claims, 5 Drawing Sheets

(56) References Cited

U.S. PATENT DOCUMENTS

| | | | | |
|---|---|---|---|---|
| 8,874,739 | B2* | 10/2014 | Gao | H04L 41/046 709/224 |
| 2002/0112052 | A1* | 8/2002 | Brittingham | G06F 9/44505 709/224 |
| 2009/0204663 | A1* | 8/2009 | Patwari | H04N 7/17318 709/203 |
| 2016/0105350 | A1* | 4/2016 | Greifeneder | H04L 41/046 709/224 |
| 2016/0342497 | A1* | 11/2016 | Kempster | G06F 11/3433 |

FOREIGN PATENT DOCUMENTS

| | | |
|---|---|---|
| CN | 102004693 A | 4/2011 |
| CN | 102510422 A | 6/2012 |
| CN | 102521099 A | 6/2012 |
| WO | 2011126995 A1 | 10/2011 |

OTHER PUBLICATIONS

Stone, B & Julie Symons, "Unix Fault Management: A Guide for System Administration" Dec. 3, 1999, Prentice Hall. Print.

Chinese Office Action for Application No. 2012104208673 dated Dec. 6, 2015, and an English concise explanation of relevance thereof.

International Preliminary Report for International Application No. PCT/CN2013/086098 dated May 14, 2015.

International Search Report for International Application No. PCT/CN2013/086098 dated Feb. 20, 2014.

* cited by examiner

METHOD, APPARATUS AND SYSTEM FOR DETERMINING SOFTWARE PERFORMANCE

CROSS-REFERENCE TO RELATED APPLICATIONS

This application is a continuation of International Application No. PCT/CN2013/086098, filed on Oct. 29, 2013. This application claims the benefit and priority of Chinese Application No. 201210420867.3, filed on Oct. 29, 2012. The entire disclosures of each of the above applications are incorporated herein by reference.

FIELD

The present disclosure relates to a method, apparatus and system for determining software performance.

BACKGROUND

This section provides background information related to the present disclosure which is not necessarily prior art.

With the development of communication technology, software can implement various functions. Software performance directly impacts user experience. Thus, the software performance needs to be evaluated to improve the software performance.

There are various methods for determining software performance.

In first method, before the software is published the software is run on multiple computers in a laboratory environment to acquire resource occupancy conditions, such as CPU occupancy rate, the number of IO reading/writing, the size of memory, and so on when the software is running on each computer. The software performance is determined according to the CPU occupancy rate, the number of the 10 reading/writing, and the size of the memory when the software is running on each computer. In second method, after the software is published, time consumed on key steps of running the software is acquired during a process of running the software. According to the time assumed on the key steps, the software performance is determined.

There are the following shortcomings in the conventional technology. In the first method, since the resource occupancy conditions, such as the CPU occupancy rate, the number of the IO reading/writing, the size of the memory, and so on when the software is running on each computer is acquired in the laboratory environment and the number of the computers in the laboratory are limited, the software performance determined according to the first method is not accurate. In the second method, it is hard to configure the key steps of running the software. Furthermore, since the software performance is determined only according to the key steps rather than the whole process of running the software, the software performance determined according to the second method is not accurate.

SUMMARY

This section provides a general summary of the disclosure, and is not a comprehensive disclosure of its full scope or all of its features.

A method, apparatus and system for determining software performance is provided according to various embodiments.

A method for determining software performance includes:
acquiring, by a server, performance parameters of operation systems of running the software and performance parameters of run software from various user terminals;
processing, by the server, the performance parameters of the operation system of running the software and the performance parameters of the run software to acquire a performance parameter processing result according to a preset method for processing a performance parameter; and
determining, by the server, performance of the software according to the performance parameter processing result.

A system for determining software performance includes:
a performance parameter acquiring module, to acquire performance parameters of operation systems of running the software and performance parameters of run software from various user terminals during a process of running the software on various user terminals after software is published.
a performance analyzing module to process the performance parameters of the operation system of running the software and the performance parameters of the run software to acquire a performance parameter processing result according to a preset method for processing a performance parameter; and
a data analyzing module, to determine performance of the software according to the performance parameter processing result.

In various embodiments, after software is published, during a process of running the software on various user terminals, the performance parameters of operation systems of running the software and the performance parameters of run software from various user terminals are acquired from various user terminals. The performance parameters of the operation systems of running the software and the performance parameters of the run software are processed to acquire a performance parameter processing result according to a preset method for processing a performance parameter. Performance of the software is determined according to the performance parameter processing result. Since the performance parameters of the operation systems of running the software and the performance parameters of run software are based on the whole process of running the software, rather than one or more key steps during the process, performance of determining the software performance becomes more accurate. Furthermore, since there is no need to configure a key step during a processing of running the software, the method can be implemented easily.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

In order to make examples of the present disclosure clearer, drawings for examples of the present disclosure are briefly described. The following drawings are only for partial examples of the present invention, but are not all examples. Those skilled in the art can obtain other drawings without creative labor.

Corresponding reference numerals indicate corresponding parts throughout the several views of the drawings.

DETAILED DESCRIPTION

Various embodiments will now be described more fully with reference to the accompanying drawings.

In order to make the technical scheme and advantages of the present disclosure clearer, the present disclosure is described in further detail hereinafter with reference to accompanying drawings and examples.

Figure 1:
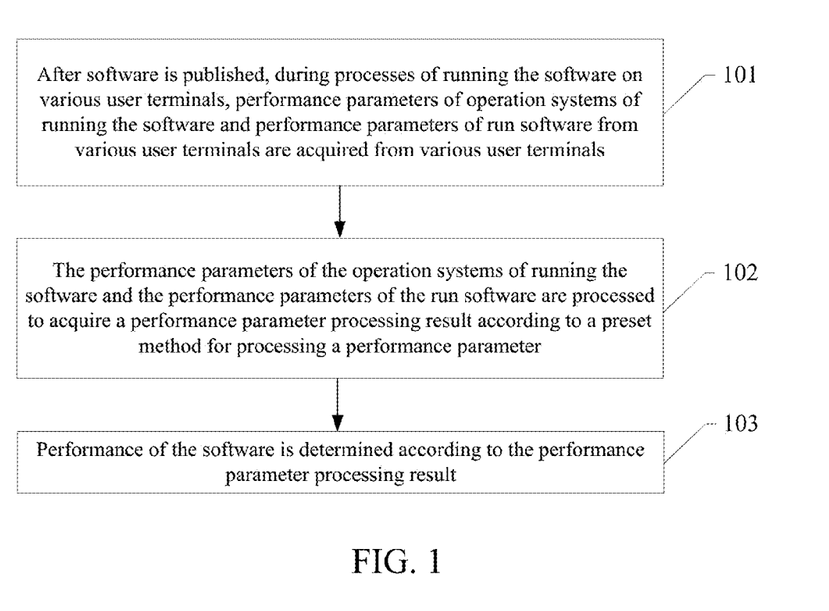
FIG. 1 is a flowchart illustrating a method for determining software performance according to various embodiments.

A method for determining software performance is provided according to various embodiments, as shown in FIG. 1. The method may be implemented by using a server or a terminal device. The terminal device may be a mobile terminal, such as a mobile phone, a smartphone, a notebook computer, a tablet PC, and so on. In addition, the terminal device may also be a mobile terminal that is not moved, such as a desktop computer and so on.

Block 101: After software is published, during processes of running the software on various user terminals, performance parameters of operation systems of running the software and performance parameters of run software from various user terminals are acquired from various user terminals. A user terminal may be a terminal device on which the software runs.

Block 102: The performance parameters of the operation systems of running the software and the performance parameters of the run software are processed to acquire a performance parameter processing result according to a preset method for processing a performance parameter.

Block 4103: Performance of the software is determined according to the performance parameter processing result.

Acquiring performance parameters of the operation systems of running the software and performance parameters of run software from various user terminals after the software is published includes:

acquiring performance information of the operation systems of running the software and performance information of run software from various user terminals after the software is published; and transforming the performance information of the operation systems of running the software and the performance information of the run software into quantized performance parameters of the operation systems of running the software and quantized performance parameters of the run software.

Acquiring performance information of the operation systems of running the software and performance information of run software from various user terminals after the software is published include acquiring performance information of the operation systems of running the software of a same version and performance information of the run software of the same version from various user terminals after the software of the same version is published.

Transforming the performance information of the operation systems of running the software and the performance information of the run software into quantized performance parameters of the operation systems of running the software and quantized performance parameters of the run software includes transforming the performance information of the operation systems of running the software of the same version and the performance information of the run software of the same version into quantized performance parameters of the operation systems of running the software of the same version and quantized performance parameters of the run software of the same version.

Processing the performance parameters of the operation systems of running the software and the performance parameters of the run software are to acquire the performance parameter processing result according to the preset method for processing a performance parameter processing the performance parameters of the operation systems of running the software of the software of the same version and the performance parameters of the run software of the same version to acquire the performance parameter processing result according to the preset method for processing a performance parameter.

Determining the performance of the software according to the performance parameter processing result includes determining the performance of the software of the same version according to the performance parameter processing result.

Determining whether the software continues being published according to the performance of the software includes determining whether the software of the same version continues being published according to the performance of the software of the same version.

Acquiring performance information of the operation systems of running the software and performance information of run software from various user terminals after the software is published includes acquiring performance information of the operation systems of running the software of different versions and performance information of the run software of different versions from various user terminals after the software of different versions is published.

Transforming the performance information of the operation systems of running the software and the performance information of the run software into the quantized performance parameters of the operation systems of running the software and the quantized performance parameters of the run software includes transforming the performance information of the operation systems of running the software of different versions and the performance information of the run software of different versions into quantized performance parameters of the operation systems of running the software of different versions and quantized performance parameters of the run software of different versions.

Processing the performance parameters of the operation systems of running the software and the performance parameters of the run software are to acquire the performance parameter processing result according to the preset method for processing a performance parameter processing the performance parameters of the operation systems of running the software of the software of different versions and the performance parameters of the run software of different versions to acquire the performance parameter processing result according to the preset method for processing a performance parameter.

Determining the performance of the software according to the performance parameter processing result includes determining the performance of the software of different versions according to the performance parameter processing result.

Determining whether the software continues being published according to the performance of the software includes determining whether the software of different versions continues being published according to the performance of the software of different versions.

In various embodiments, after software is published, during a process of running the software on various user terminals, the performance parameters of operation systems of running the software and the performance parameters of run software from various user terminals are acquired from various user terminals. The performance parameters of the operation systems of running the software and the performance parameters of the run software are processed to acquire a performance parameter processing result according to a preset method for processing a performance parameter. Performance of the software is determined according to the performance parameter processing result. Since the performance parameters of the operation systems of running the software and the performance parameters of run software are based on the whole process of running the software, rather than one or more key steps during the process, performance of determining the software performance becomes more accurate. Furthermore, since there is no need to configure a key step during the process of running the software, the method can be implemented easily.

Figure 2:
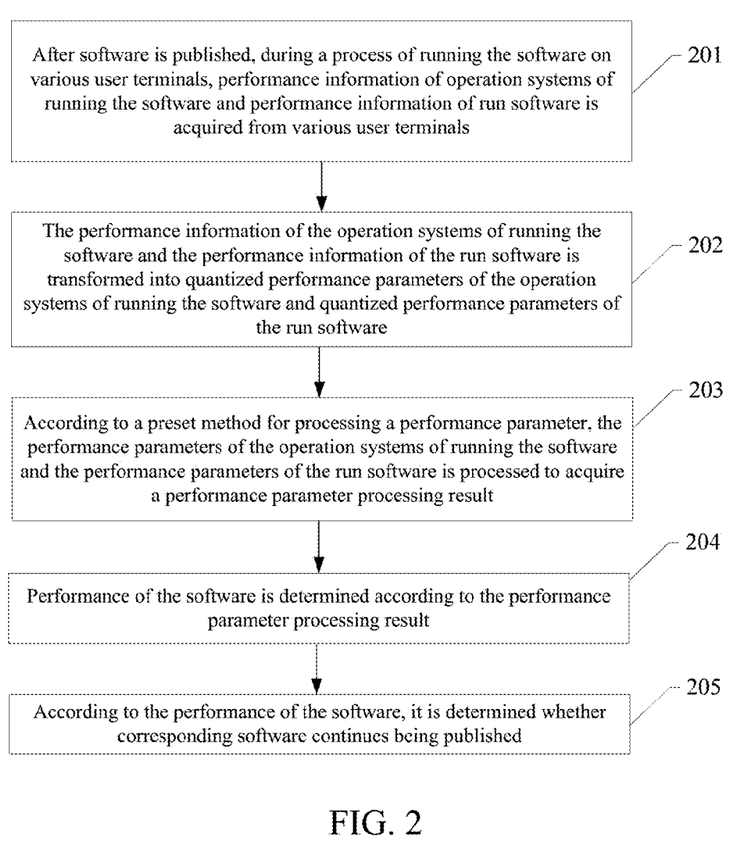
FIG. 2 is a flowchart illustrating a method for determining software performance according to various embodiments.

A method for determining software performance is provided according to various embodiments, as shown in FIG. 2.

The method may be implemented by such as a server or a terminal device. The terminal device may be a mobile terminal, such as a mobile phone, a smartphone, a notebook computer, a tablet PC, and so on. In addition, the terminal device may also be a mobile terminal that is not moved, such as a desktop computer and so on.

Block 201: After software is published, during a process of running the software on various user terminals, performance information of operation systems of running the software and performance information of run software is acquired from various user terminals. A user terminal can be a terminal device on which the software runs.

When the operation systems of running the software are windows operation systems, the performance information of the operation systems of running the software and the performance of the run software is collected by an Event Tracing for Windows (ETW) mechanism. The performance information of the operation systems of running the software includes the speed of opening a start menu, the speed of opening an Internet Explorer (IE), and so on, by which current operation condition of the operation systems is determined and user experience is reflected. The performance information of the run software includes the popping-up time of a software interface, the response speed of a software button, CPU occupancy rate, the number of 10 reading/writing times size of occupied memory, and so on, which may reflect the ease of running the software.

After collecting the performance information of the operation systems of running the software and the performance information of the run software, an Extraction-Transformation-Loading (ETL) file is generated, which includes the performance information of the operation systems of running the software and the performance information of the run software.

Block 202: The performance information of the operation systems of running the software and the performance information of the run software is transformed into quantized performance parameters of the operation systems of running the software and quantized performance parameters of the run software.

If the ETL file, including the performance information of the operation systems of running the software and the performance information of the run software is generated, the performance information of the operation systems of running the software and the performance information of the run software is extracted from the ETL file based on the ETW mechanism and transformed into the quantized performance parameters of the operation systems of running the software and the quantized performance parameters of the run software by calling the ETW related API.

The performance parameter of the operation system of running the software includes the speed of opening a start menu, the speed of opening an IE, and so on. The performance parameter of the run software includes the popping-up time of a software interface, the response speed of a software button, CPU occupancy rate, the number of IO reading/writing times size of occupied memory, and so on. In various embodiments, after software is published, the performance parameter of the operation system of running the software and the performance parameter of the run software may be directly acquired during the process of running the software on various user terminals.

Block 203: According to a preset method for processing a performance parameter, the performance parameters of the operation systems of running the software and the performance parameters of the run software is processed to acquire a performance parameter processing result.

The corresponding method for processing the performance parameter is preset according to a specific condition of the performance parameter of the operation system of running the software and the performance parameter of the run software. According to the preset method for processing a performance parameter, the performance parameters of the operation systems of running the software and the performance parameters of the run software are processed to acquire a performance parameter processing result. For example, the preset method for processing a performance parameter is generating a performance distribution state diagram for the performance parameters of the operation systems of running the software and the performance parameters of the run software, generating a performance direct cubic diagram for the performance parameters of the operation systems of running the software and the performance parameters of the run software, generating a performance chart diagram for the performance parameters of the operation systems of running the software and the performance parameters of the run software. The preset method for processing the performance parameter may also be processing the performance parameters of the operation systems of running the software and the performance parameters of the run software in another way.

Block 204: Performance of the software is determined according to the performance parameter processing result. The performance of the software may be determined according to the performance parameter processing result, such as a performance distribution state curve in the performance distribution state diagram, a performance direct cubic curve in the performance direct cubic diagram, and so on.

Block 205: According to the performance of the software, it is determined whether corresponding software continues being published. Determining whether corresponding software continues to be published according to the performance of the software includes:

determining whether the performance of the software satisfies a preset publishing condition;

determining that the software continues being published if the performance of the software satisfies the preset publishing condition; and determining that the software does not continue being published if the performance of the software does not satisfy the preset publishing condition.

In various embodiments, the preset publishing condition may be the following:

if the performance of the software is good, it is determined that the software continues to be published; and if the performance of the software is poor or unstable, it is determined that the software does not continue to be published.

The performance of the software may be determined for software of the same version. If the performance of the software is determined for the software of the same version, after the above software is published, acquiring the performance information of the operation systems of running the software and the performance information of the run software during a process of running the software on the user terminals includes acquiring the performance information of the operation systems of running the software of the same version after the software of the same version is published and the performance information of the run software of the same version during a process of running the software of the same version on the user terminals.

Transforming the performance information of the operation systems of running the software and the performance information of the run software into the performance parameters of the operation systems of running the software and the performance parameters of the run software includes transforming the performance information of the operation systems of running the software of the same version and the performance information of the run software of the same version into the performance parameters of the operation systems of running the software of the same version and the performance parameters of the run software of the same version.

Processing the performance parameters of the operation systems of running the software and the performance parameters of the run software according to the preset method for processing the performance parameters to acquire the performance parameter processing result includes processing the performance parameters of the operation systems of running the software of the same version and the performance parameters of the run software of the same version according to the preset method for processing a performance parameter to acquire the performance parameter processing result.

Determining the performance of the software according to the performance parameter processing result includes determining the performance of the software of the same version according to the performance parameter processing result.

Determining whether the software continues to be published according to the performance of the software includes determining whether the software of the same version continues to be published according to the performance of the software of the software of the same version.

When the performance of the software is determined, the performance of the software is determined for the software of different versions. After the software is published, acquiring the performance information of the operation systems of running the software and the performance information of the run software during a process of running the software on the user terminals includes acquiring the performance information of the operation systems of running the software of different versions after the software of different versions is published and the performance information of the run software of different versions during a process of running the software of different versions on the user terminals.

Transforming the performance information of the operation systems of running the software and the performance information of the run software into the performance parameters of the operation systems of running the software and the performance parameters of the run software includes transforming the performance information of the operation systems of running the software of different versions and the performance information of the run software of different versions into the performance parameters of the operation systems of running the software of different versions and the performance parameters of the run software of different versions.

Processing the performance parameters of the operation systems of running the software and the performance parameters of the run software according to the preset method for processing a performance parameter to acquire the performance parameter processing result includes processing the performance parameters of the operation systems of running the software of different versions and the performance parameters of the run software of the different versions according to the preset method for processing a performance parameter to acquire the performance parameter processing result.

Determining the performance of the software according to the performance parameter processing result includes determining the performance of the software of the software of different versions according to the performance parameter processing result. Determining whether the software continues to be published according to the performance of the software includes determining whether the software of different versions continues to be published according to the performance of the software of the software of different versions.

In various embodiments, the preset method for processing a performance parameter is generating a performance distribution state diagram for performance parameters of the operation systems of running the software and performance parameters of the run software.

Figure 3:
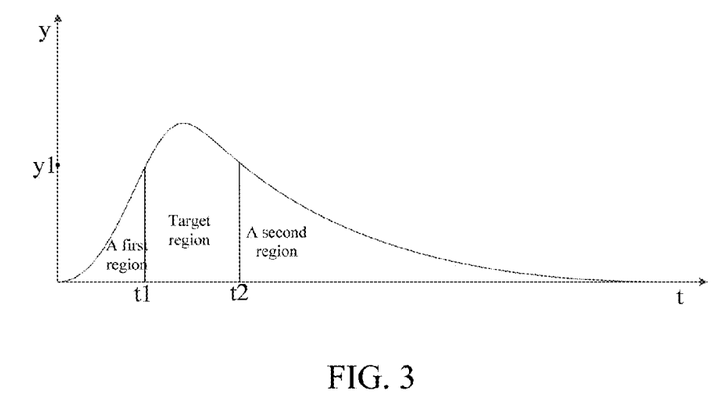
FIG. 3 is a performance distribution state diagram for software of a same version according to various embodiments.

The performance parameters of the operation systems of running the software of the same version and the performance parameters of the run software of the same version is processed to acquire the performance distribution state curve in a performance distribution state diagram. Horizontal axis (t) represents a time point during a process (such as the process of starting a menu or the process of popping up a software interface) in the performance parameters of the operation systems of running the software and the performance parameters of the run software in seconds. Longitudinal axis (y) represents the number of users distributed at a time point in millions. When user distribution is more concentrated, the performance of the software is better. The basis of determining whether the software continues to be published is as follows. As shown in FIG. 3, a longitudinal coordinate value of a coordinate point y1 on the longitudinal axis is equal to "a" percent of a peak of the distribution state curve, wherein "a" can be acquired according to an experiment and can be preferably set as 80. Two horizontal coordinate values of two coordinate points t1, t2 (it is assumed that t1 is less than t2) on the horizontal axis are respectively the same as two horizontal coordinate horizontal values of two coordinate points on the performance distribution state curve, wherein two longitudinal coordinate values of the two horizontal coordinate points on the performance distribution state curve are respectively the same as that of the coordinate point y1. A line between the coordinate point t1 and a coordinate point are as a lift dividing line, wherein the coordinate point is on the performance distribution state curve, the horizontal coordinate value of the coordinate point is the same as that of t1, and the longitudinal coordinate value of the coordinate point is the same as that of y1. A line between the coordinate point t2 and a coordinate point are as a right dividing line, wherein the coordinate point is on the performance distribution state curve, the horizontal coordinate value of the coordinate point is the same as that of t2, and the longitudinal coordinate value of the coordinate point is the same as that of y1. Thus, as shown in FIG. 3, a region between the horizontal axis and the distribution state curve in the performance distribution state diagram is divided into three parts: a target region, a first region, and a second region. Areas of the three parts are respectively computed. When a ratio of area of the second region and the area of the region between the horizontal axis and the distribution state curve is larger than a first preset proportional value (set as b %, which is preferably set as 10%), it is determined that the performance of the software is poor. When a ratio of area of the target region and the area of the region between the horizontal axis and the distribution state curve is less than a second preset proportional value (set as c %, which is preferably set between 70 and 80%), it is determined that the performance of the software is unstable.

Figure 4:
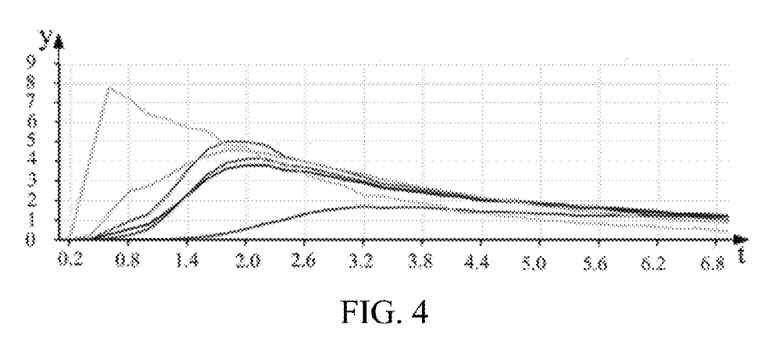
FIG. 4 is a performance distribution state diagram for software of different versions according to various embodiments.

The performance parameters of the operation systems of running the software of different versions and the performance parameters of the run software of different versions may be processed to acquire performance distribution state curves respectively corresponding to software of different versions. FIG. 4 is a performance distribution state diagram of software of different versions. Horizontal axis (t) represents a time point of a process (such as the process of starting a menu or the process of popping up a software interface) in the performance parameters of the operation systems of running the software and the performance parameters of the run software in seconds. Longitudinal axis (y) represents the number of users distributed at a time point in millions. User distribution is more concentrated and the performance of the software is better. The distribution state curves in the performance distribution state diagram corresponds to software of different version, as shown in FIG. 4. The basis of determining whether the software continues to be published is, after a threshold t is set, when a horizontal coordinate value of a peak on any one of the distribution state curves is larger than the threshold t, it is determined that the performance of the software is poor and the software does not continue to be published.

Figure 5:
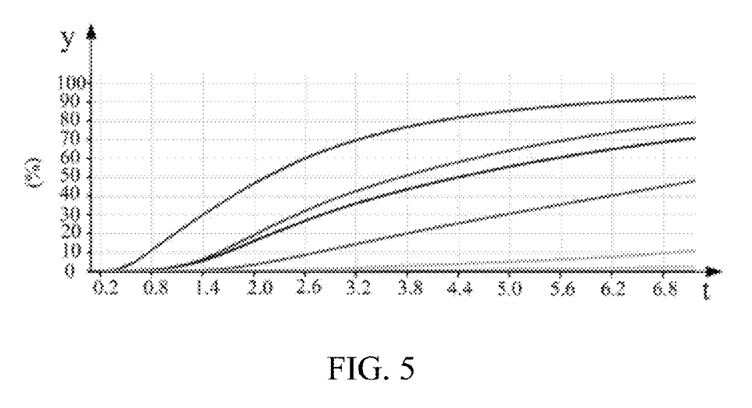
FIG. 5 is a performance cumulative distribution state diagram for software of different versions according to various embodiments.

The performance parameters of the operation systems of running the software of different versions and the performance parameters of the run software of different versions may be processed to acquire performance cumulative distribution state curves respectively corresponding to software of different versions. A performance cumulative distribution state curve is an area curve corresponding to a performance distribution state curve. An area value of a region between the performance distribution state curve and the horizontal axis before the coordinate point t on the horizontal axis is set as the longitudinal coordinate value of a coordinate point on the performance cumulative distribution state curve, wherein the horizontal coordinate value of the coordinate point is the same as that of the coordinate point t on the horizontal axis. In order to compare among software of different versions, a ratio of the area value of the region between the performance distribution state curve and the horizontal axis before the coordinate point t on the horizontal axis and an area value of a region between the performance distribution state curve and the horizontal axis in the performance distribution state diagram is set as the longitudinal coordinate value f(t) of the coordinate point on the performance cumulative distribution state curve, wherein the horizontal coordinate value of the coordinate point is the same as that of the coordinate point t on the horizontal axis.

FIG. 5 is a performance cumulative distribution state diagram of software of different versions. Horizontal axis (t) represents a time point of a process (such as the process of starting a menu or the process of popping up a software interface) in the performance parameters of the operation systems of running the software and the performance parameters of the run software in seconds. Longitudinal axis (y) represents a ratio of an area value of the region between the performance distribution state curve and the horizontal axis before the horizontal axis t and an area value of the region between the performance distribution state curve and the horizontal axis in the performance distribution state diagram. The result is more concentrated user distribution and improved software stability performance. When the user distribution is nearer to the lift of the horizontal axis, the performance of the software is improved.

The basis of determining whether the software continues to be published is that when a longitudinal coordinate value of a coordinate point on a performance cumulative distribution state curve of software of a same version is less than a longitudinal coordinate value of a coordinate point on a preset basic performance cumulative distribution state curve, the horizontal coordinate value of which is the same as that of the coordinate point on the performance cumulative distribution state curve of software of the same version, it is determined that the performance of the software is poor and the software does not continue to be published.

In various embodiments, after software is published, during a process of running the software on various user terminals, the performance parameters of operation systems of running the software and the performance parameters of run software from various user terminals are acquired from various user terminals. The performance parameters of the operation systems of running the software and the performance parameters of the run software are processed to acquire a performance parameter processing result according to a preset method for processing a performance parameter. Performance of the software is determined according to the performance parameter processing result. Since the performance parameters of the operation systems of running the software and the performance parameters of run software are based on the whole process of running the software rather than one or more key steps during the process, performance of determining the software performance becomes more accurate. Furthermore, since there is no need to configure a key step during the process of running the software, the method can be implemented easily.

Figure 6:
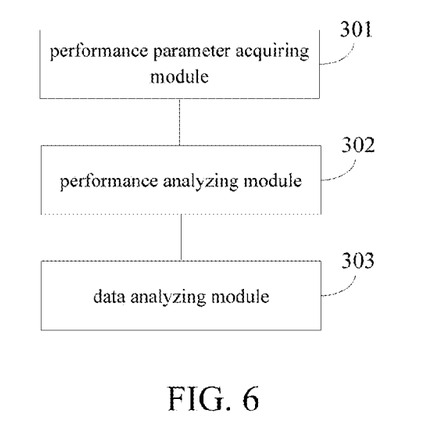
FIG. 6 is a diagram illustrating a structure of a system for determining software performance according to various embodiments.

FIG. 6 is a diagram illustrating a structure of a system for determining software performance. The system includes a performance parameter acquiring module 301, a performance analyzing module 302, and a data analyzing module 303. The performance parameter acquiring module 301 acquires performance parameters of operation systems of running the software and performance parameters of run software from various user terminals during a process of running the software on various user terminals after software is published. The performance analyzing module 302 processes the performance parameters of the operation system of running the software and the performance parameters of the run software to acquire a performance parameters processing result according to a preset method for processing a performance parameter.

Figure 7:
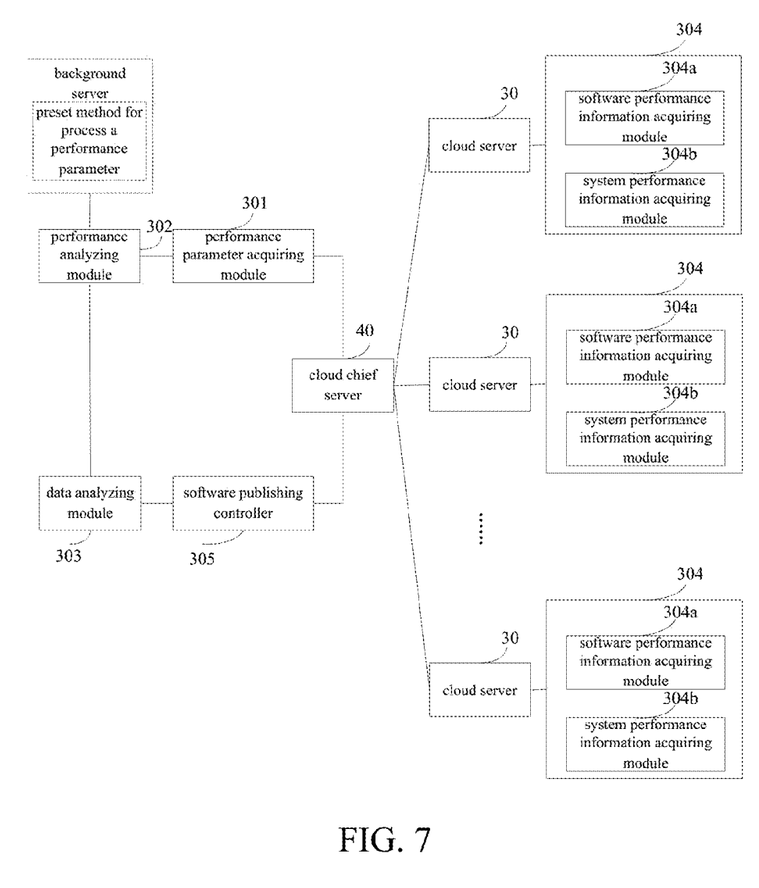
FIG. 7 is a diagram illustrating a structure of a system for determining software performance according to various embodiments.

As shown in FIG. 7, the preset method for processing a performance parameter may be pre-stored in a background server, which may be acquired when the method is required by the performance analyzing module 302. The data analyzing module 303 determines performance of the software according to the performance parameter processing result.

As shown in FIG. 7, the system further includes at least one performance information acquiring module 304. The performance information acquiring module 304 acquires performance information of operation systems of running the software and performance information of run software during a process of running the software on various user terminals after software is published.

As shown in FIG. 7, the performance information acquiring module 304 includes a software performance information acquiring module 304a and a system performance information acquiring module 304b. The software performance information acquiring module 304a acquires the performance parameters of run software from various user terminals during a process of running the software on various user terminals after software is published. The system performance information acquiring module 304b acquires the performance parameters of operation systems of running the software during a process of running the software on various user terminals after software is published.

As shown in FIG. 7, multiple cloud servers 30 are configured. The multiple cloud servers 30 respectively acquire the performance information of operation systems of running the software and the performance information of run software during a process of running the software on various user terminals after the software is published from the performance information acquiring module 304. The multiple cloud servers 30 may be configured according to geographic locations, which are not limited herein. As shown in FIG. 7, a cloud chief server 40 is configured to acquire the performance information of operation systems of running the software and the performance information of run software during a process of running the software on various user terminals acquired by the multiple cloud servers 30.

The performance parameter acquiring module 301 transforms the performance information of the operation systems of running the software and the performance information of the run software acquired by the performance information acquiring module 304 into quantized performance parameters of the operation systems of running the software and quantized performance parameters of the run software. The performance information acquiring module 304 acquires performance information of the operation systems of running the software of a same version and performance information of the run software of the same version from various user terminals after the software of the same version is published. The performance parameter acquiring module 301 transforms the performance information of the operation systems of running the software of the same version and the performance information of the run software of the same version into quantized performance parameters of the operation systems of running the software of the same version and quantized performance parameters of the run software of the same version. The performance analyzing module 302 processes the performance parameters of the operation systems of running the software of the software of the same version and the performance parameters of the run software of the same version to acquire the performance parameter processing result according to the preset method for processing a performance parameter. The data analyzing module 303 determines the performance of the software of the same version according to the performance parameter processing result. The performance information acquiring module 304 acquires performance information of the operation systems of running the software of different versions and performance information of the run software of different versions from various user terminals after the software of different versions is published. The performance parameter acquiring module 301 transforms the performance information of the operation systems of running the software of different versions and the performance information of the run software of different versions into quantized performance parameters of the operation systems of running the software of different versions and quantized performance parameters of the run software of different versions. The performance analyzing module 302 processes the performance parameters of the operation systems of running the software of the software of different versions and the performance parameters of the run software of different versions to acquire the performance parameter processing result according to the preset method for processing a performance parameter. The data analyzing module 303 determines the performance of the software of different versions according to the performance parameter processing result.

As shown in FIG. 7, the system further includes a software publishing controller 305, to determine whether the software continues to be published according to the performance of the software. The software publishing controller 305 provides information on whether the software continues to be published to the cloud chief server 40, so that the cloud chief server 40 controls whether the software continues to be published.

In various embodiments, after software is published, during a process of running the software on various user terminals, the performance parameters of operation systems of running the software and the performance parameters of run software from various user terminals are acquired from various user terminals. The performance parameters of the operation systems of running the software and the performance parameters of the run software are processed to acquire a performance parameter processing result according to a preset method for processing a performance parameter. Performance of the software is determined according to the performance parameter processing result. Since the performance parameters of the operation systems of running the software and the performance parameters of run software are based on the whole process of running the software, rather than one or more key steps during the process, performance of determining the software performance becomes more accurate. Furthermore, since there is no need to configure a key step during a processing of running the software, the method can be implemented easily.

It should be noted that the system provided according to the above example is only an example of dividing each functional module. In various embodiments, the above functions may be implemented by different functional modules. That is, a structure of the system is divided into different functional modules to implement all or part of functions described above. In addition, the implementation process of the system for determining software performance is explained in detail in various embodiments of the method for determining software performance, which is not described repeatedly herein.

The methods and modules described herein may be implemented by hardware, machine-readable instructions or a combination of hardware and machine-readable instructions. Machine-readable instructions used in the various embodiments disclosed herein may be stored in storage medium readable by multiple processors, such as hard drive, CD-ROM, DVD, compact disk, floppy disk, magnetic tape drive, RAM, ROM or other proper storage device. Or, at least part of the machine-readable instructions may be substituted by specific-purpose hardware, such as custom integrated circuits, gate array, FPGA, PLD and specific-purpose computers, and so on.

Figure 8:
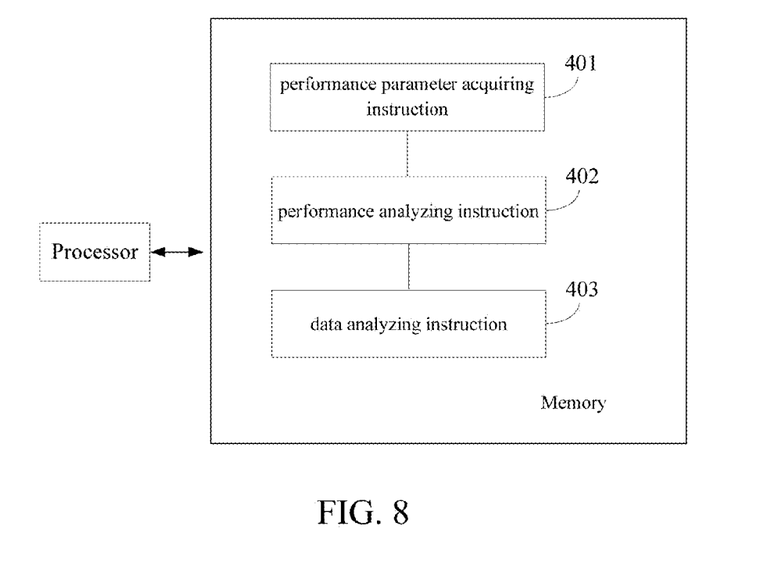
FIG. 8 is a diagram illustrating a structure of an apparatus for determining software performance according to various embodiments.

FIG. 8 is a diagram illustrating a structure of an apparatus for determining software performance. The apparatus includes a processor for executing instructions stored in a memory. The instructions include a performance parameter acquiring instruction 401, a performance analyzing instruction 402, and a data analyzing instruction 403.

The performance parameter acquiring instruction 401 acquires performance parameters of operation systems of running the software and performance parameters of run software from various user terminals during a process of running the software on various user terminals after software is published. The performance analyzing instruction 402 processes the performance parameters of the operation system of running the software and the performance parameters of the run software to acquire a performance parameters processing result according to a preset method for processing a performance parameter. The performance parameter acquiring instruction 401 acquires performance parameters of operation systems of running the software of a same version and performance parameters of run software of the same version from various user terminals during a process of running the software on various user terminals after software is published.

The performance analyzing instruction 402 processes the performance parameters of the operation systems of running the software of the software of the same version and the performance parameters of the run software of the same version to acquire the performance parameter processing result according to the preset method for processing a performance parameter. The data analyzing instruction 403 determines the performance of the software of the same version according to the performance parameter processing result.

Furthermore, the performance parameter acquiring instruction 401 acquires performance parameters of operation systems of running the software of different versions and performance parameters of run software of different versions from various user terminals during a process of running the software on various user terminals after software is published. The performance analyzing instruction 402 processes the performance parameters of the operation systems of running the software of the software of different versions and the performance parameters of the run software of different versions to acquire the performance parameter processing result according to the preset method for processing a performance parameter. The data analyzing instruction 403 determines the performance of the software of different versions according to the performance parameter processing result.

Figure 9:
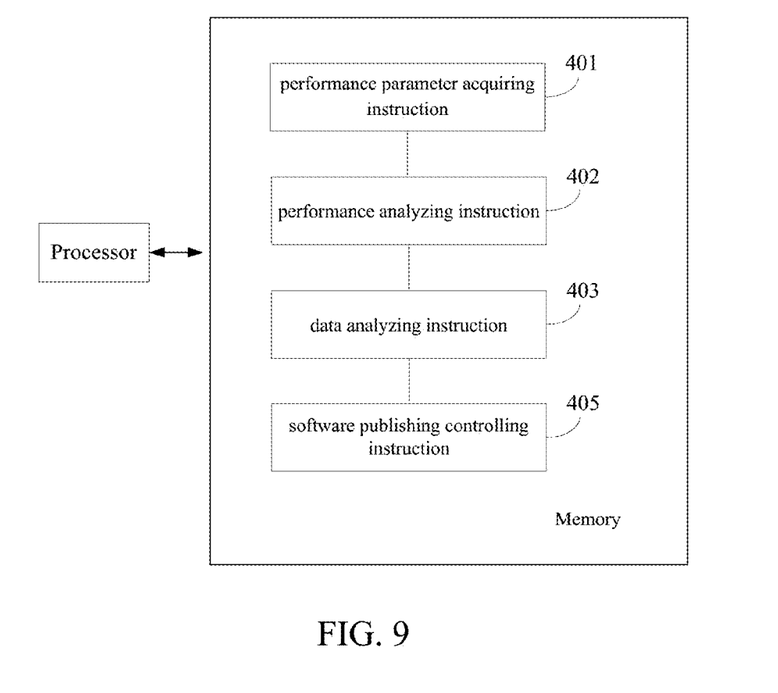
FIG. 9 is a diagram illustrating a structure of an apparatus for determining software performance according to various embodiments.

As shown in FIG. 9, the system further includes a software publishing controlling instruction 405, to determine whether the software continues being published according to the performance of the software. In various embodiments, after software is published, during a process of running the software on various user terminals, the performance parameters of operation systems of running the software and the performance parameters of run software from various user terminals are acquired from various user terminals. The performance parameters of the operation systems of running the software and the performance parameters of the run software are processed to acquire a performance parameter processing result according to a preset method for processing a performance parameter. Performance of the software is determined according to the performance parameter processing result. Since the performance parameters of the operation systems of running the software and the performance parameters of run software are based on the whole process of running the software, rather than one or more key steps during the process, performance of determining the software performance becomes more accurate. Furthermore, since there is no need to configure a key step during a processing of running the software, the method can be implemented easily.

The foregoing are only various examples of the present disclosure and are not used to limit the protection scope of the present disclosure. Any modification, equivalent substitution, and improvement without departing from the spirit and principle of the present disclosure are within the protection scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

What is claimed is:

1. A method for determining software performance, comprising:
   acquiring, by a server, performance parameters of operation system of running the software of a same version and performance parameters of run software of the same version from various user terminals;

processing, by the server, the performance parameters of the operation system of running the software of the same version and the performance parameters of the run software of the same version to acquire a performance parameters processing result according to a preset method for processing a performance parameter; and determining, by the server, the performance of the software of the same version according to the performance parameters processing result;

wherein processing the performance parameters of the operation systems of running the software of the same version and the performance parameters of the run software of the same version to acquire the performance parameters processing result comprises:

generating, by the server, a performance distribution state diagram for the software of the same version, wherein the performance parameters processing result comprises a performance distribution state curve of the software of the same version;

wherein determining the performance of the software of the same version according to the performance parameters processing result comprises:

determining, by the server, that the performance of the software of the same version is poor when a ratio of an area value of a region among a performance distribution state curve, a horizontal axis and a right dividing line and an area of a region between the horizontal axis and the distribution state curve is larger than a first preset proportional value;

determining, by the server, that the performance of the software of the same version is unstable when a ratio of an area value of a target region and an area value of a region between the horizontal axis and the distribution state curve is less than a second preset proportional value.

2. The method of claim 1, further comprising: determining, by the server, whether the software continues being published according to the performance of the software.

3. A method for determining software performance, comprising:

acquiring, by a server, performance parameters of operation systems of running the software of different versions and performance parameters of run software of different versions from various user terminals;

processing, by the server, the performance parameters of the operation system of running the software of different versions and the performance parameters of the run software of different versions to acquire a performance parameters processing result according to a preset method for processing a performance parameter; and determining, by the server, the performance of the software of different versions according to the performance parameters processing result;

wherein processing the performance parameters of the operation systems of running the software of different version and the performance parameters of the run software of different versions to acquire the performance parameters processing result comprises:

generating, by the server, a performance distribution state diagram for the software of different versions, wherein the performance parameters processing result comprises a performance distribution state curve of the software of different versions;

wherein determining the performance of the software of different versions according to the performance parameters processing result comprises:

determining, by the server, that the performance of the software is poor when a horizontal coordinate value of a peak on any one of the performance distribution state curves is larger than a threshold.

4. The method according to claim 3, wherein processing the performance parameters of the operation system of running the software of different versions and the performance parameters of the run software of different versions to acquire the performance parameters processing result comprises:

generating, by the server, a performance cumulative distribution state diagram for the software of different versions, wherein the performance parameters processing result comprises performance cumulative distribution state curves of the software of different versions;

determining the performance of the software according to the performance parameters processing result comprises:

determining, by the server, that the performance of the software is poor when a longitudinal coordinate value of a coordinate point on a performance cumulative distribution state curve in the generated performance cumulative distribution state diagram is less than a longitudinal coordinate value of a coordinate point on a preset basic performance cumulative distribution state curve, wherein the horizontal coordinate value of the coordinate point on the preset basic performance cumulative distribution state curve is the same as that of the coordinate point on the performance cumulative distribution state curve.

5. A system for determining software performance, comprising:

a processor for executing instructions stored in a memory;

a performance parameter acquiring module, executed by the processor to acquire performance parameters of operation system of running the software of a same version and performance parameters of run software of the same version from various user terminals during a process of running the software of the same version on various user terminals after software is published;

a performance analyzing module, executed by the processor to process the performance parameters of the operation system of running the software of the same version and the performance parameters of the run software of the same version to acquire a performance parameters processing result according to a preset method for processing a performance parameter; and a data analyzing module, executed by the processor to determine performance of the software of the same version according to the performance parameters processing result;

wherein the performance analyzing module is executed by the processor to generate a performance distribution state diagram for the software of the same version, wherein the performance parameters processing result comprises a performance distribution state curve of the software of the same version;

the data analyzing module is executed by the processor to determine that the performance of the software is poor when a ratio of an area value of a region among a performance distribution state curve, a horizontal axis and a right dividing line and an area of a region between the horizontal axis and the distribution state curve is larger than a first preset proportional value, determine that the performance of the software is unstable when a ratio of an area value of a target region and an area value of a region between the horizontal axis and the distribution state curve is less than a second preset proportional value.

6. The system according to claim 5, further comprising: a software publishing controller, executed by the processor, to determine whether the software continues being published according to the performance of the software.

7. A system for determining software performance, comprising:
a processor for executing instructions stored in a memory;
a performance parameter acquiring module, executed by the processor to acquire performance parameters of operation system of running the software of different versions and performance parameters of run software of different versions from various user terminals during a process of running the software of different versions on various user terminals after software is published;
a performance analyzing module, executed by the processor to process the performance parameters of the operation system of running the software of different versions and the performance parameters of the run software of different versions to acquire a performance parameters processing result according to a preset method for processing a performance parameter; and
a data analyzing module, executed by the processor to determine performance of the software of different versions according to the performance parameters processing result;
wherein the performance analyzing module is executed by the processor to generate a performance distribution state diagram for the software of different versions, wherein the performance parameters processing result comprises performance distribution state curves of the software of different versions;
the data analyzing module is executed by the processor to determine that the performance of the software is poor when a horizontal coordinate value of a peak on any one of the performance distribution state curves is larger than a threshold.

8. The system according to claim 7, wherein the performance analyzing module is executed by the processor to generate a performance cumulative distribution state diagram for the software of different versions, wherein the performance parameters processing result comprises performance cumulative distribution state curves of the software of different versions;
the data analyzing module is executed by the processor to determine that the performance of the software is poor when a longitudinal coordinate value of a coordinate point on a performance cumulative distribution state curve in the generated performance cumulative distribution state diagram is less than a longitudinal coordinate value of a coordinate point on a preset basic performance cumulative distribution state curve, wherein the horizontal coordinate value of the coordinate point on the preset basic performance cumulative distribution state curve is the same as that of the coordinate point on the performance cumulative distribution state curve.

9. An apparatus for determining software performance, comprising:
a processor for executing instructions stored in a memory, the instructions comprising:
a performance parameter acquiring instruction, to acquire performance parameters of operation system of running the software of a same version and performance parameters of run software of the same version from various user terminals during a process of running the software on various user terminals after software is published;
a performance analyzing instruction, to process the performance parameters of the operation system of running the software of the same version and the performance parameters of the run software of the same version to acquire a performance parameters processing result according to a preset method for processing a performance parameter; and
a data analyzing instruction is to determine performance of the software of the same version according to the performance parameters processing result;
wherein the performance analyzing instruction is to generate a performance distribution state diagram for the software of the same version, wherein the performance parameter processing result comprises a performance distribution state curve of the software of the same version;
the data analyzing instruction is to determine that the performance of the software is poor when a ratio of an area value of a region among a performance distribution state curve, a horizontal axis and a right dividing line and an area of a region between the horizontal axis and the distribution state curve is larger than a first preset proportional value, determine that the performance of the software is unstable when a ratio of an area value of a target region and an area value of a region between the horizontal axis and the distribution state curve is less than a second preset proportional value.

10. The apparatus according to claim 9, further comprising: a software publishing controlling instruction, to determine whether the software continues being published according to the performance of the software.

11. An apparatus for determining software performance, comprising:
a processor for executing instructions stored in a memory, the instructions comprising:
a performance parameter acquiring instruction, to acquire performance parameters of operation system of running the software of different versions and performance parameters of run software of different versions from various user terminals during a process of running the software on various user terminals after software is published;
a performance analyzing instruction, to process the performance parameters of the operation system of running the software of different versions and the performance parameters of the run software of different versions to acquire a performance parameters processing result according to a preset method for processing a performance parameter; and
a data analyzing instruction is to determine performance of the software of different versions according to the performance parameters processing result;
wherein the performance analyzing instruction is to generate a performance distribution state diagram for the software of different versions, wherein the performance parameters of processing result comprises performance distribution state curves of the software of different versions;
the data analyzing instruction is to determine that the performance of the software is poor when a horizontal coordinate value of a peak on any one of the performance distribution state curves is larger than a threshold.

* * * * *